(12) United States Patent
Handley et al.

(10) Patent No.: US 7,792,368 B2
(45) Date of Patent: Sep. 7, 2010

(54) MONOTONIC CLASSIFIER (75) Inventors: John C. Handley, Fairport, NY (US);
Steven Jay Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1064 days.

(21) Appl. No.: 11/201,344

(22) Filed: Aug. 10, 2005

(65) Prior Publication Data
US 2007/0036441 A1 Feb. 15, 2007

(51) Int. Cl.
*G06K 9/68* (2006.01)
*G06K 9/46* (2006.01)

(52) U.S. Cl. ......................... 382/226; 382/240
(58) Field of Classification Search ........... 382/224, 382/226; 707/1
See application file for complete search history.

(56) References Cited
U.S. PATENT DOCUMENTS
6,101,275 A * 8/2000 Coppersmith et al. ....... 382/226
2004/0015478 A1* 1/2004 Pauly ............................. 707/1

OTHER PUBLICATIONS

Riskin, E.A.; Gray, R.M., "A greedy tree growing algorithm for the design of variable rate vector quantizers [image compression]," Signal Processing, IEEE Transactions on , vol. 39, No. 11, pp. 2500-2507, Nov. 1991.*
Douglas Comer, Ubiquitous B-Tree, ACM Computing Surveys (CSUR), v.11 n.2, p. 121-137, Jun. 1979.*
Potharst, R. et al., "Classification Trees for Problems with Monotonicity Constraints", SIGKDD Explorations, vol. 4, Issue 1, 10 pp.
Potharst, R. et al., "Monotone Decision Trees", Department of Computer Science, Erasmus University Rotterdam, 39 pp.
Ben-David, Arie, "Monotonicity Maintenance in Information-Theoretic Machine Learning Algorithms", Machine Learning, vol. 19, pp. 29-43.
Sill, Joseph et al., "Monotonicity Hints", 7 pp.
Feelders, A.J., "Prior Knowledge in Economic Applications of Data Mining", 11 pp.

* cited by examiner

*Primary Examiner*—Bhavesh M Mehta
*Assistant Examiner*—Hadi Akhavannik
(74) *Attorney, Agent, or Firm*—Pepper Hamilton LLP (57) ABSTRACT

A method and system for generating a monotonic classifier are disclosed. A plurality of feature vectors may be mapped to a plurality of ordered classes. Each feature vector may map to a corresponding class. For each class other than the lowest-ordered class, a binary classifier may be trained to distinguish between the class and a directly preceding class in the order. The binary classifiers may be ordered based on the class corresponding to each classifier. The binary classifiers may be ordered in the form of a decision tree, which may be either balanced or unbalanced. A new feature vector pertaining to an individual may then be classified using the binary classifiers.

15 Claims, 7 Drawing Sheets

MONOTONIC CLASSIFIER

TECHNICAL FIELD

The disclosed embodiments generally relate to the field of data classification. More particularly, the disclosed embodiments relate to implementing a monotonic classifier using one or more binary classifiers.

BACKGROUND

Applicant classification is performed for a plurality of reasons, such as credit scoring, college applicant selection, scoring of compliance examinations and the like. In such activities, data mining is often performed to extract relevant data from information submitted by a plurality of applicants. After the data is extracted, a classifier can be used to provide an ordered classification of states. In particular, a classifier that generates a monotonic classification of states is desirable. A monotonic dataset is one that exhibits consistency such that for all i, j if $X_i \leq X_j$, $c_i \leq c_j$, where $X_i$ and $X_j$ represent feature vectors and $c_i$ and $c_j$ represent classes to which $X_i$ and $X_j$ pertain, respectively.

For example, if all measured data for applicant A exceeds the measured data for applicant B and the list of potential outcomes are monotonically classified, applicant A will obtain a higher rating or score than applicant B. An exemplary dataset used to determine credit-worthiness might include, for example, three features (represented as a feature vector $X_j$) for each individual: (i) income (in thousands of dollars), (ii) number of years of home ownership, and (iii) number of years with current employer. Moreover the dataset might include, for example, three ordered classifications for credit-worthiness (represented as a class $c_i$): (i) low, (ii) medium, and (iii) high. A monotonic data set may be created for particular feature vectors and classes. For example, an exemplary monotonic dataset may include the following features and resulting classifications: $\{(X_1, c_1)=(50, 2, 5; \text{medium}), (X_2, c_2)=(70, 10, 25; \text{high}), (X_3, c_3)=(65, 0, 7; \text{low}), (X_4, c_4)=(40, 30, 35; \text{high})\}$. For the exemplary feature vectors and classes, when $X_i \leq X_j$, $c_i \leq c_j$ as well, such as for $(X_1, c_1)$ and $(X_2, c_2)$.

However, conventional statistical classifiers, such as neural networks or classification trees, do not guarantee monotonicity, even when trained on data that is monotonic. Violation of monotonicity can expose reviewers using classifiers to liability for inexplicable scoring decisions.

Conventional monotonic classifiers have been generated using a learning set of feature vectors and their true classes (i.e., $L=\{(X_1, c_1), \ldots, (X_n, c_n)\}$), which are not required to be partially ordered. Such monotonic classifiers may estimate an increasing classifiers such that $f(X)$ is an estimate of the class c of X. f must be exactly increasing to provide monotonic classification. One method for creating a monotonic classifier is to examine all increasing classifiers in order to determine which classifier has the least estimated error on the learning set. Methods of building monotonic classification trees are disclosed in R. Potharst and A. J. Feelders, "Classification Trees for Problems with Monotonicity Constraints," SIGKDD Explorations, 4:1-10 (June 2002); R. Potharst, et al., "Monotone Decision Trees," Erasmus University, Rotterdam, The Netherlands (August 1997); A. Ben-David, "Monotonicity Maintenance in Information-Theoretic Machine Learning Algorithms," Machine Learning 19:29-43 (April 1995); J. Sill and Y. S. Abu-Mostafa, "Monotonicity Hints" Neural Information Processing Systems Foundation 9:634-40 (1997).

One problem with determining an appropriate increasing classifier is that an exhaustive search might be required. What is needed is a classification method that generates a monotonic classifier, but does not require an exhaustive search of increasing classifiers.

A need exists for a monotonic classifier that uses a conventional classification method not requiring specialized algorithms.

A further need exists for a monotonic classifier that reduces the time needed to perform the calculations used to reach its classification determination.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "class" is a reference to one or more classes and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

An implementation of a monotonic classifier is disclosed that does not require the computationally intensive algorithms described in the prior art. The monotonic classifier may include a plurality of binary classifiers that divide the feature space into nested sets with increasing labels. A particular monotonic classifier may include a balanced binary tree of binary classifiers to perform monotonic classification.

In an embodiment, a method for generating a monotonic classifier may include mapping a plurality of feature vectors to a plurality of ordered classes such that each feature vector maps to a corresponding class, for each class other than a lowest-ordered class, training a binary classifier to distinguish between the class and a preceding class, and ordering the binary classifiers as a monotonic classifier based on the class corresponding to each classifier.

In an embodiment, a system for generating a monotonic classifier may include a processor, and a processor-readable storage medium. The processor-readable storage medium may include one or more programming instructions for performing a method for generating a monotonic classifier. The method may include mapping a plurality of feature vectors to a plurality of ordered classes such that each feature vector maps to a corresponding class, for each class other than a lowest-ordered class, training a binary classifier to distinguish between the class and a preceding class, and ordering the binary classifiers based on the class corresponding to each classifier.

In an embodiment, a method of assigning a credit-worthiness score to an applicant may include mapping a plurality of feature vectors to a plurality of ordered credit-worthiness classes such that each feature vector maps to a corresponding credit-worthiness class, for each credit-worthiness class other than a lowest-ordered credit-worthiness class, training a binary classifier to distinguish between the credit-worthiness class and a preceding credit-worthiness class, ordering the binary classifiers as a monotonic classifier based on the credit-worthiness class corresponding to each classifier, receiving applicant data pertaining to an applicant, organizing the applicant data into an applicant feature vector pertaining to the applicant, and assigning a credit-worthiness class to the applicant based on the monotonic classifier and the applicant feature vector.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

Data mining may extract relevant data from information submitted by a plurality of applicants. A classifier may be used to provide an ordered classification of states for mined data. A classifier may be used to implement a rule set for classifying inputs into a set of output states. In particular, a classifier that generates a monotonic classification of states may be desirable. Monotonic classifiers may be achieved by restricting searches to classes of monotonic functions. As disclosed herein, monotonic classification may be performed using binary classifiers without resort to specialized algorithms.

Depending upon the data being measured, a "better" score may be either a higher score or a lower score. In the description contained herein, a reference to a higher score refers to a better score based on the data metric regardless of whether the score is actually higher or lower in actuality.

For a particular classification, $X=(x_1, \ldots, x_n)$ may represent a feature vector. For example, $x_i$ may represent personal data, such as personal income and/or a period of time that an individual has been a homeowner. $x_i$ may also represent test scores, housing prices, credit scores and/or the like.

In an embodiment, a classifier f may map feature vectors that are completely ordered. In other words, mapping may be performed by ordering the classes corresponding to each feature vector in a linear order from a lowest ranking to a highest ranking. For example, the classes may relate to credit scores or admission decisions (e.g., reject, wait list, accept on probation, accept without funding, accept with funding). A classifier f may be monotonically increasing if $X \leq Y$ implies that $f(X) \leq f(Y)$.

In an embodiment, it may be possible that for particular values of X and Y neither $X \leq Y$ nor $Y \leq X$. This may occur, for example, if $X=(1, 2, 1)$ and $Y=(2, 1, 2)$. In such a case, the set of feature vectors may be partially ordered. In other words, when $X<Y$, $f(X)<f(Y)$. However, when X is neither less than nor greater than Y, the ordering may be determined by the class to which X and Y are assigned.

Figure 1:
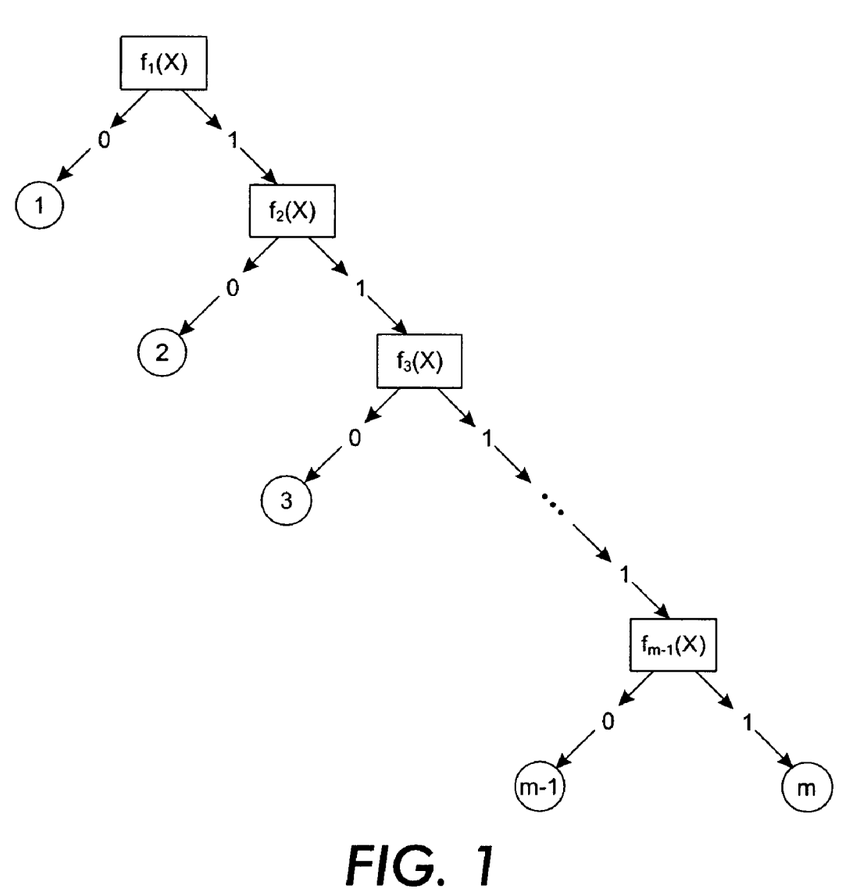
FIG. 1 depicts an exemplary monotonic classification tree according to an embodiment.

In an embodiment, an increasing classifier f may be constructed by cascading binary classifiers $f_1$ to $f_{m-1}$ into a decision tree as shown in FIG. 1. The arrangement of binary classifier shown in FIG. 1 may implement a monotonic classifier that advantageously offers easy estimation of data without recourse to specialized algorithms. Additional classifiers may be used to estimate m classes. In an embodiment, the binary tree may use m−1 binary classifiers arranged sequentially to determine which of the m classes the feature vector X represents.

As shown in FIG. 1, given a learning set of feature vectors and their true classes, $L=\{(X_1, c_1), \ldots, (X_n, c_n)\}$, and natural numbers $1, \ldots, m$ used to denote the classes, a series of binary classifiers may be used to provide a monotonically ordered output classification. For example, if $K_1=\{X_i \text{ in } L | c_i=1\}$ and $K_{1+}=\{X_i \text{ in } L | c_i>1\}$, a binary classifiers $f_1$ may be trained to split L into $K_1$ and $K_{1+}$, such that $f_1(X)=1$ if X is in $K_1$ and $f_1(X)=1$ if X is in $K_{1+}$. In an embodiment, $f_1$ may be forced to be increasing by modifying $f_1$ so that any elements greater than the least elements of $\{X \oplus f(X)=1\}$ may be mapped to 1.

A second binary classifier $f_2$ may then be trained to split $K_{1+}$ into, for example, two sets, $K_2=\{X_i \text{ in } L | c_i=2\}$ and $K_{2+}=\{X_i \text{ in } L | c_i>2\}$. Classifier $f_2$ may be further modified to make it increasing.

Figure 2:
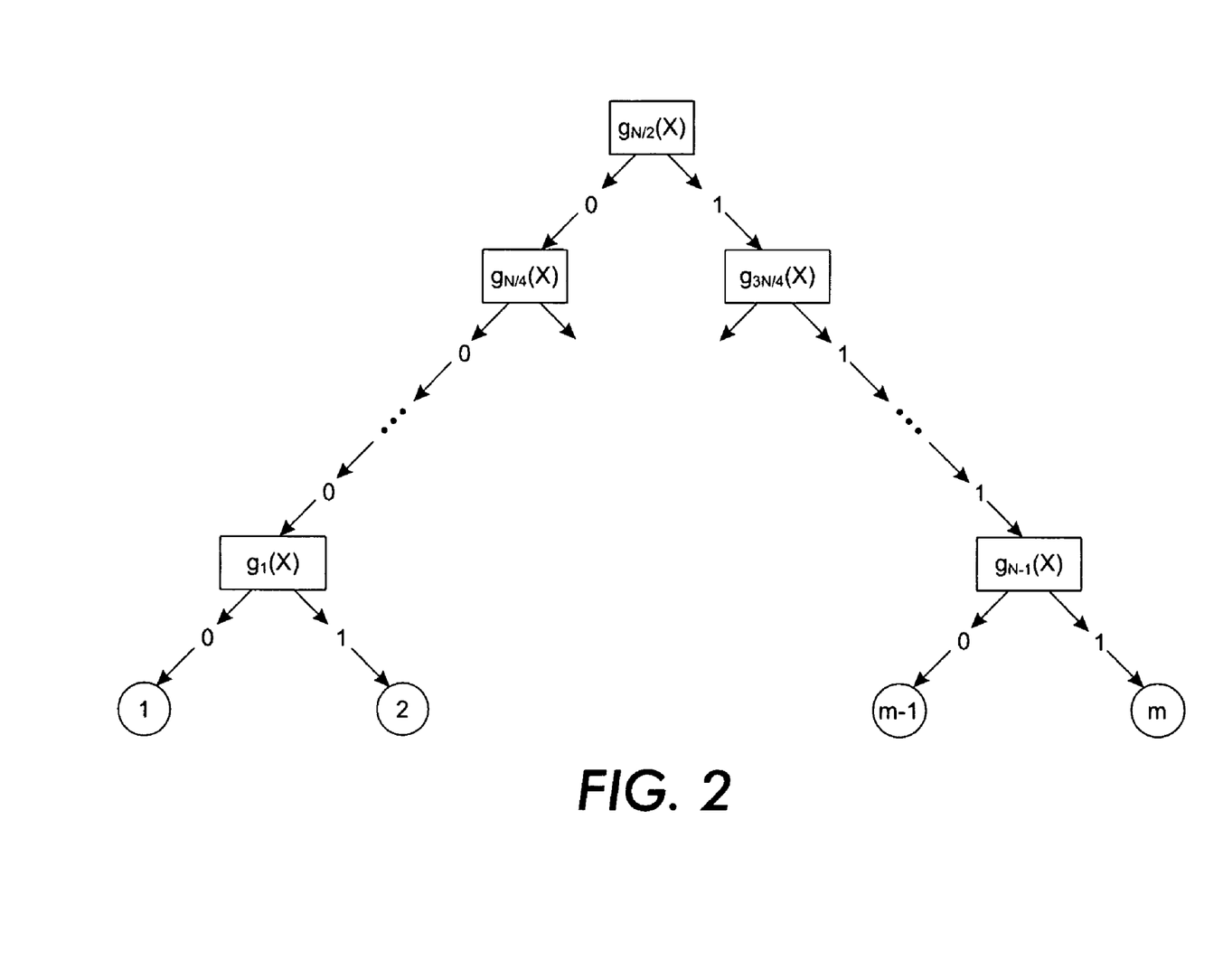
FIG. 2 depicts an exemplary balanced monotonic classification tree according to an embodiment.

FIG. 2 depicts an exemplary balanced monotonic classification tree according to an embodiment. In an embodiment, a balanced tree of binary classifiers may be used to classify data. In an exemplary embodiment, $K_{p-}=\{X_i \text{ in } L | c_i \leq p\}$ and $K_{p+}=\{X_i \text{ in } L | c_i > p\}$. A binary classifier $g_p$ may be trained to split L into $K_{p-}$ and $K_{p+}$ such that $g_p(X)=0$ if X is in $K_{p-}$ and $g_p(X)=1$ if X is in $K_{p+}$. $g_p$ may be modified to be increasing by mapping any elements greater than the least elements of $\{X | g_p(X)=1\}$ to 1 and any elements less than the greatest elements of $\{X | g_p(X)=0\}$ to 0. The binary classifiers may then be assembled into a balanced binary decision tree of the form shown in FIG. 2. In particular, the binary classifiers $\{g_1, \ldots, g_{m-1}\}$ may be arranged such that the median classifier of the set of classifiers for a particular branch is placed at the node for each level. In other words, $g_{m/2}$ may be placed at the root node, $g_{m/4}$ and $g_{3m/4}$ may be placed at the nodes for the next level, and so on. In other words, the value of p for the binary classifier $g_{m/2}$ may be approximately the median value of p; the value of p for $g_{m/4}$ may be approximately the $25^{th}$ percentile value for p; the value of p for $g_{3m/4}$ may be approximately the $75^{th}$ percentile value for p; and so on. The arrangement of the decision tree in FIG. 2 may reduce the time to determine the classification for a particular feature vector from O(N), as in FIG. 1, to O(log(N)). Accordingly, the balanced classification tree may permit more efficient access to classified data.

Figure 3:
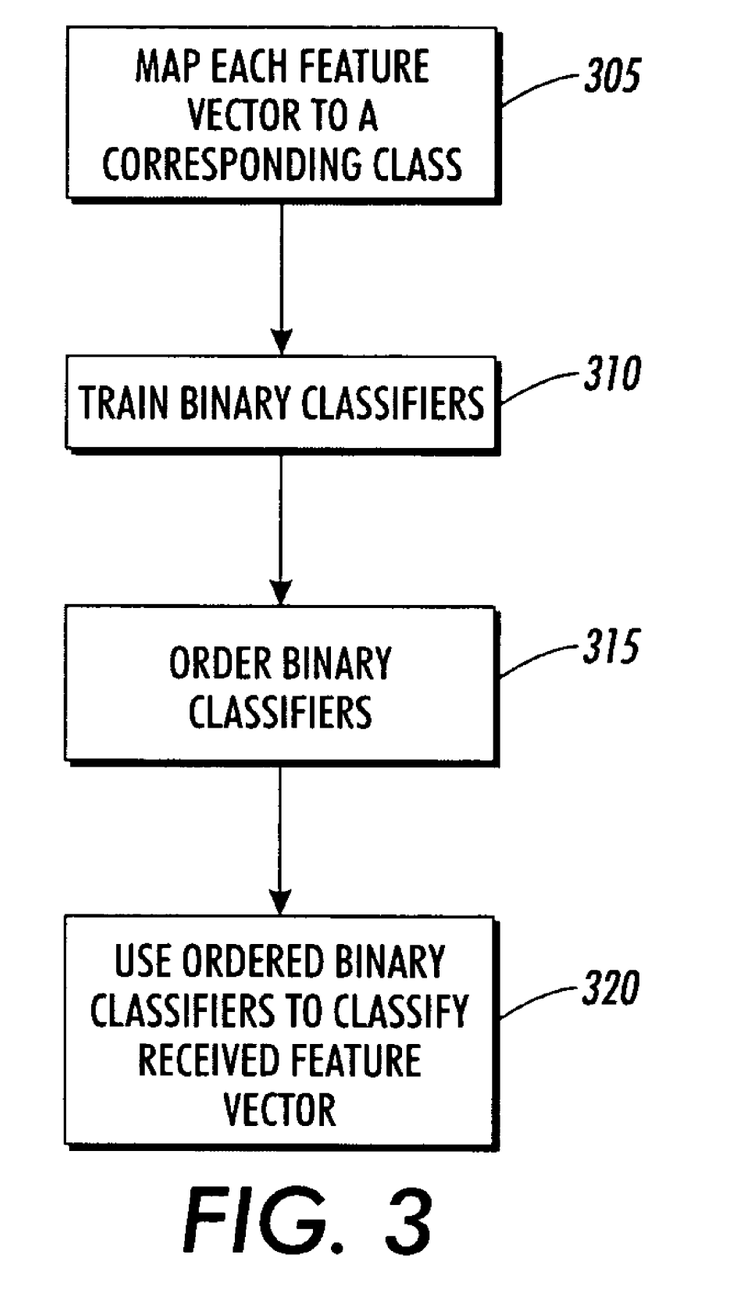
FIG. 3 depicts a flow diagram of an exemplary process for training a monotonic classifier according to an embodiment.

FIG. 3 depicts a flow diagram of an exemplary process for training a monotonic classifier according to an embodiment. As shown in FIG. 3, each feature vector may be mapped 305 to a corresponding class. In an embodiment, the mapping may include ordering the classes from 1 to m and ordering the feature vectors from $X_1$ to $X_m$, such that $X_i$ is not greater than $X_{i+1}$ for each i. In such an embodiment, $X_i$ may correspond to class i.

For each class other than class 1, a binary classifier may be trained 310 to distinguish between: (i) feature vectors corresponding to classes less than the class; and (ii) feature vectors corresponding to classes greater than or equal to the class. For example, a training set, $L=\{(X_1, c_1), \ldots, (X_n, c_n)\}$, may be used where class $c_i=0$ or 1. The symbol $X_i$ may represent a feature vector of feature observations $X_i=(X_{i1}, \ldots, X_{im})$. For example, $X_i$ may be equal to (75, 2), where "75" represents income (in thousands of dollars) for applicant i and "2" represents the number of years of employment for applicant i. A recursive partitioning method for training a binary classifier may then be used. Methods for training the binary classifier may include procedures known by those of ordinary skill in the art, such as Classification and Regression Trees (CART), C4.5, or any other procedure used to train decision trees.

The training process may be used to recursively split the data into subsets with increasing data set purity. Data set purity may be calculated based on the proportion of elements with a given class. For example, a subset may be termed "pure" if it contains only elements of a certain class, such as all class zero's or all class one's in the exemplary binary class case. The classifier may be trained by searching over one or more decision rules for a certain class and keeping the decision rules that result in the largest increase in data set purity. In an embodiment, decision rules may be restricted to rules of the form $X_{ij} \leq t$, where $X_{ij}$ is the jth component of the ith observation and t is a threshold.

For a given data set L, $P_0(L)$ may be set equal to the number of elements in the data set with class equal to 0 divided by the number of elements in the data set, such as $$P_0(L) = \frac{|\{(X_i, c_i):c_i = 0\}|}{|L|}.$$

Likewise, $P_1(L)$ may be set equal to the number of elements in the data set with class equal to 1 divided by the number of elements in the data set, such as $$P_1(L) = \frac{|\{(X_i, c_i):c_i = 1\}|}{|L|}.$$

The impurity of a data set, I(L), may be defined as $I(L)=P_0(L)*\log_2(P_0(L))+P_1(L)*\log_2(P_1(L))$. Impurity may be maximized when the elements of the data set are equally split between class 0 and class 1. A decision rule of the form $D=X_{ij} \leq t$ may be used to split the data set L into two subsets $L_0$ and $L_1$ that maximize the decrease in impurity (i.e., maximizes the increase in purity). The decrease in impurity for a particular decision rule may be defined as $$\Delta I(L, L_0, L_1) = I(L) - \frac{|L_0|*I(L_0)}{|L|} - \frac{|L_1|*I(L_1)}{|L|}.$$

In an embodiment, if $L_0$ is not pure, $L_0$ may be further split into two subsets $L_{00}$ and $L_{01}$ that maximize the decrease in impurity for $L_0$. A similar operation may be performed on $L_1$ if necessary. Splitting may be performed recursively on one or more subsets until such subsets are pure. When the process has completed, the final subsets may be labeled with their pure class. If the resulting binary classifier is not monotonic, the labels may be modified to ensure monotonicity. A labeling that minimizes expected error may also be selected.

Although the above example used only two classes, the process described may be used for any number of classes. In a multi-class embodiment, additional data subsets $L_2$, $L_3$, etc. may be used to represent each class. Similar operations may be performed to maximize the data set purity for each class and will be apparent to those of ordinary skill in the art.

Figure 4:
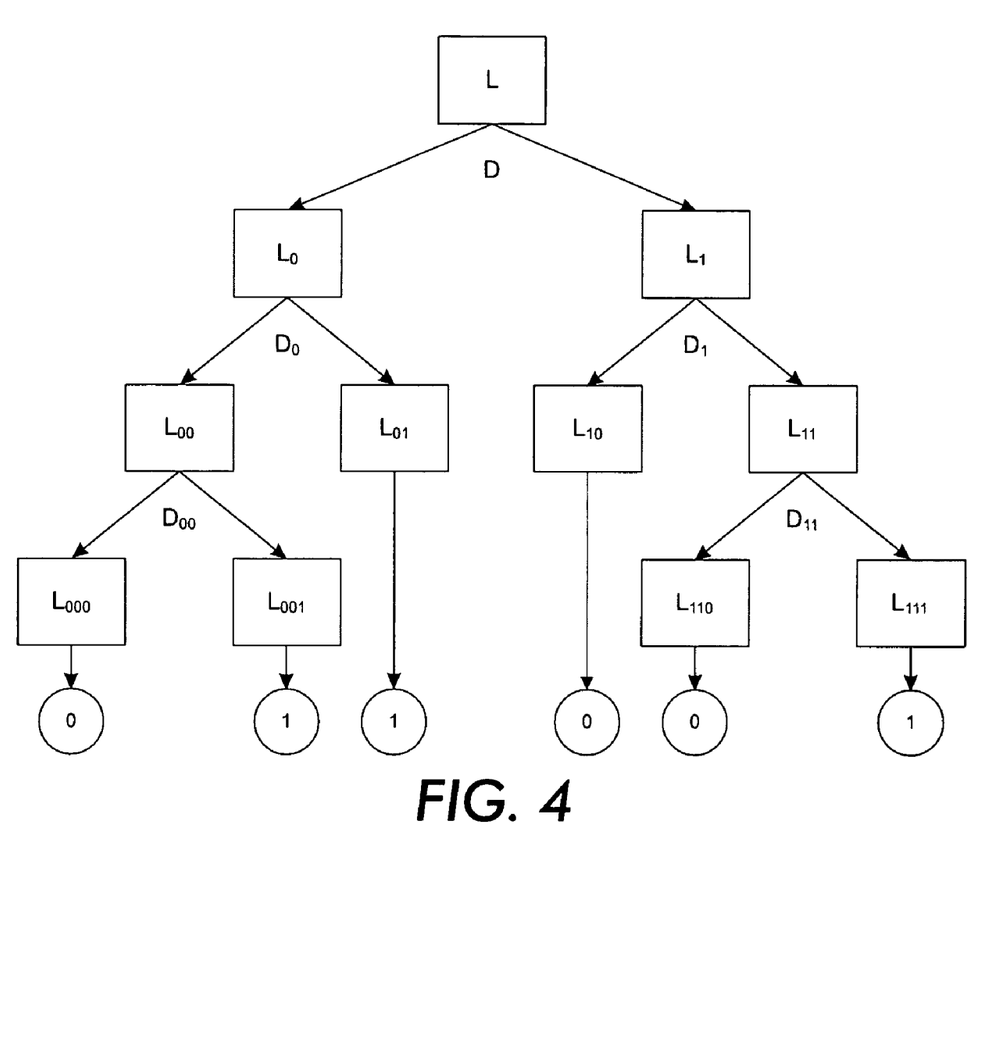
FIG. 4 depicts an exemplary decision tree in which decision rules have been used to recursively partition the tree into two classes according to an embodiment.

FIG. 4 depicts an exemplary decision tree in which decision rules have been used to recursively partition the tree into two classes according to an embodiment. In an embodiment, feature vectors corresponding to classes less than a particular class may not be greater than a feature vector corresponding to the particular class, as defined above. As shown in FIG. 4, decision rule D may separate the data to be classified, L, into two subsets, $L_0$ and $L_1$. Likewise, decision rule $D_0$ may separate $L_0$ into two subsets, $L_{00}$ and $L_{01}$. Decision rules $D_{00}$, $D_1$, and $D_{11}$ may further separate the dataset. The resulting data groupings of $L_{000}$, $L_{10}$, and $L_{110}$ may be assigned to class 0, and the resulting data groupings of $L_{001}$, $L_{01}$, and $L_{111}$ may be assigned to class 1.

Referring back to FIG. 3, the binary classes may then be ordered 315 based on the class to which they correspond. In an embodiment, the binary classifiers may be ordered as a balanced decision tree. In an alternate embodiment, the binary classifiers may be ordered as an unbalanced decision tree. In an embodiment, the binary classifiers may be ordered as a linear chain of consecutively ordered binary classifiers.

The ordered binary classes may then be used to perform 320 a specific classification. For example, if the monotonic classifier pertains to college acceptance, an evaluation of a particular applicant may be performed using an applicant's criteria. Likewise, if the monotonic classifier pertains to credit scoring, an evaluation of a particular individual may be performed using the individual's credit history.

Figure 5A:
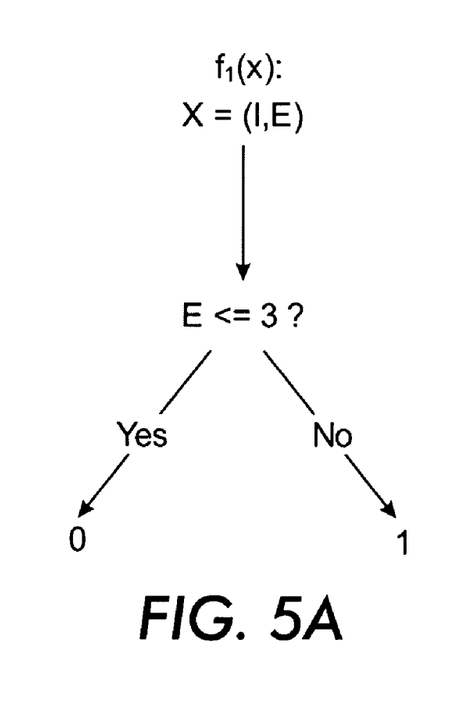
FIG. 5A depicts an exemplary monotonic binary classifier using one decision rule according to an embodiment.

FIG. 5A depicts an exemplary monotonic binary classifier using one decision rule according to an embodiment. The features of interest for the exemplary classifier may include income in thousands of dollars (I) and number of years of employment at current job (E). In an embodiment, a number of years of home ownership and/or a measure of outstanding debt may also be features of interest for a classifier. The classes (c) for the exemplary classifier may include three levels of credit-worthiness {L, M, H}, where the letters stand for Low, Medium, and High. In an embodiment, an exemplary learning set may include the following feature vectors and resulting classes: L={(25, 2, L); (50, 2, L); (25, 6, M); (50, 7, M); (75, 5, M); (75, 7, H); (100, 5, M); (100, 7, H); (100, 9, H)}.

In order to train the binary classifier, a binary training set may be constructed to separate elements with class L from elements having a higher classification (i.e., M or H). A relabeled training set to differentiate the Low elements from the Medium and High elements may be depicted as follows: L={(25, 2, 0); (50, 2, 0); (25, 6, 1); (50, 7, 1); (75, 5, 1); (75, 7, 1); (100, 5, 1); (100, 7, 1); (100, 9, 1)}. An optimal decision rule that results in data set purity for the subsets may be $$D(I, E) = \begin{cases} 0, & E \leq 3 \\ 1, & \text{otherwise} \end{cases}.$$

The resulting data subsets may include $L_0=\{(25, 2, 0); (50, 2, 0)\}$ and $L_1=\{(25, 6, 1); (50, 7, 1); (75, 5, 1); (75, 7, 1); (100, 5, 1); (100, 7, 1); (100, 9, 1)\}$. This binary classifier, $f_1(X)$, may comprise a single monotonic decision rule (i.e., if $(I_0, E_0) \leq (I_1, E_1)$, then $D(I_0, E_0) \leq D(I_1, E_1)$).

Figure 5B:
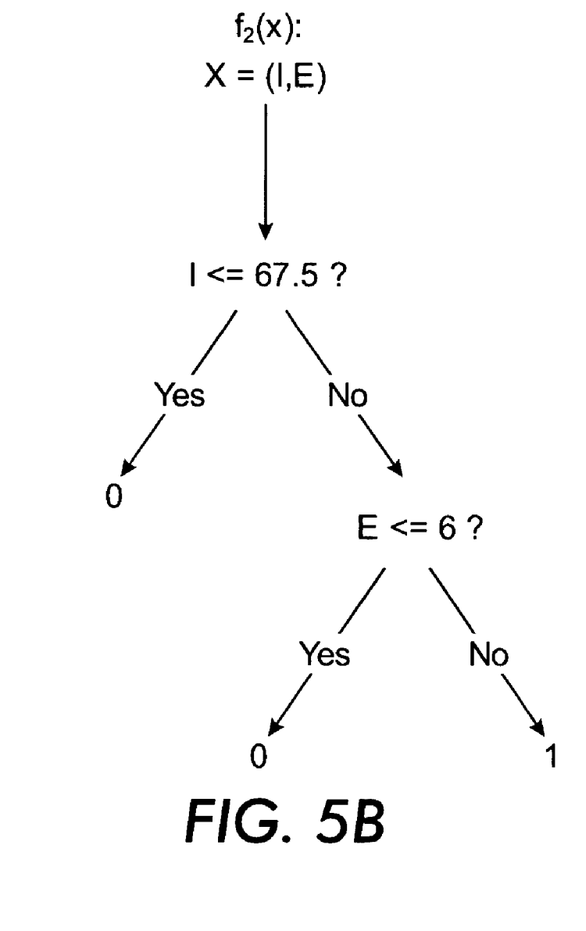
FIG. 5B depicts an exemplary monotonic binary classifier using two decision rules according to an embodiment.

FIG. 5B depicts an exemplary monotonic binary classifier using two decision rules according to an embodiment. A decision rule may be included to differentiate between the Medium and High classes. Referring back to the original learning set, it may be assumed that the feature vectors have a class of Low have been separated by the previously learned binary classifier. Accordingly, a relabeled training set to differentiate the Medium elements from the High elements may be depicted as follows: $L=\{(25, 6, 0); (50, 7, 0); (75, 5, 0); (75, 7, 1); (100, 5, 0); (100, 7, 1); (100, 9, 1)\}$. A binary classifier may then be defined for this training set. A first optimal decision rule may be $$D_0(I, E) = \begin{cases} 0, & I \leq 67.5 \\ 1, & \text{otherwise} \end{cases}.$$

This rule may separate the learning set L into two subsets: $L_0=\{(25, 6, 0); (50, 7, 0)\}$ and $L_1=\{(75, 5, 0); (75, 7, 1); (100, 5, 0); (100, 7, 1); (100, 9, 1)\}$. Subset $L_0$ may be pure and may be assigned the class 0. However, subset $L_1$ may not yet be pure and may require a second decision rule. A second optimal decision rule may be $$D_1(I, E) = \begin{cases} 0, & E \leq 6 \\ 1, & \text{otherwise} \end{cases}.$$

This rule may separate $L_1$ into two subsets: $L_{10}=\{(75, 5, 0); (100, 5, 0)\}$ and $L_{11}=\{(75, 7, 1); (100, 7, 1); (100, 9, 1)\}$. Each of these subsets may be pure and may be assigned classes 0 and 1, respectively. This binary classifier, $f_2(X)$, may thus use two monotonic decision rules.

Figure 6:
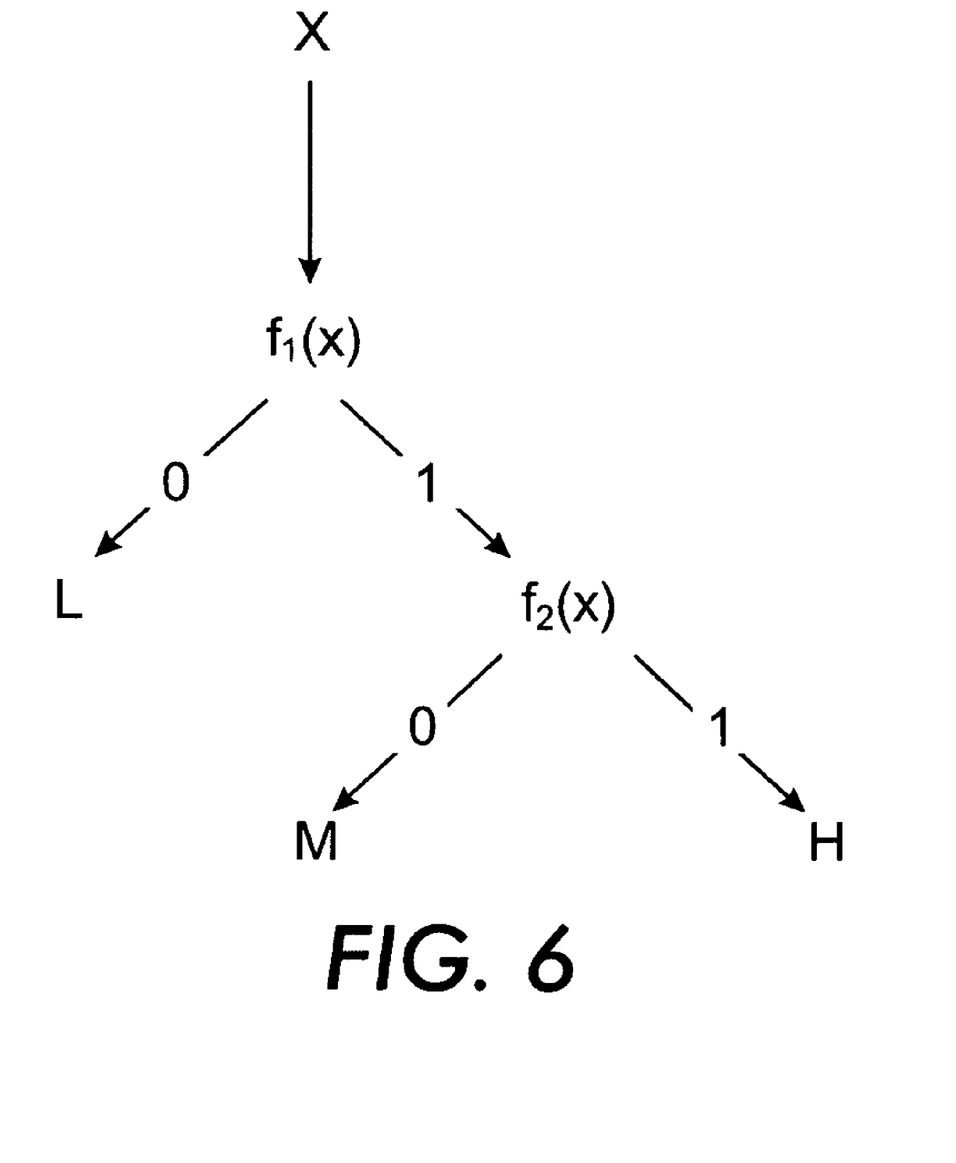
FIG. 6 depicts an exemplary monotonic classifier according to an embodiment.

FIG. 6 depicts an exemplary monotonic classifier according to an embodiment. As shown, FIG. 6 depicts the above-described $f_1(X)$ and $f_2(X)$ as nodes of a decision tree for classifying data based on the above-described dataset. In an embodiment, the decision tree may be further trained using additional feature vectors and classifications in order to more precisely define the decision rules used to classify the data. The above classifications and data are merely exemplary. In addition, alternate decision rules may be selected in order to separate the dataset into classification having data set purity. Such classifications, data, and decision rules will be apparent to those of ordinary skill in the art.

A monotonic classifier, such as the one described above in reference to FIGS. 5A, 5B and 6, may be used to classify received data. For example, an applicant for credit that makes $60,000 per year and has been working at a present job for the past seven years may apply for credit from a lender using the classifier described in reference to FIG. 6. In this case, $X_{applicant}=(60000, 7)$. Using $f_1(X)$, the lender may determine that $f_1(X)=1$ since the applicant has been employed at a present job for more than 3 years. Since $f_1(X)=1$, $f_2(X)$ may then be evaluated. Using $f_2(X)$, the lender may determine that $f_2(X)=0$ since the applicant does not make $67,500 per year. Accordingly, the lender may assign the applicant a Medium level of credit worthiness based on the classifier in FIG. 6.

Figure 7:
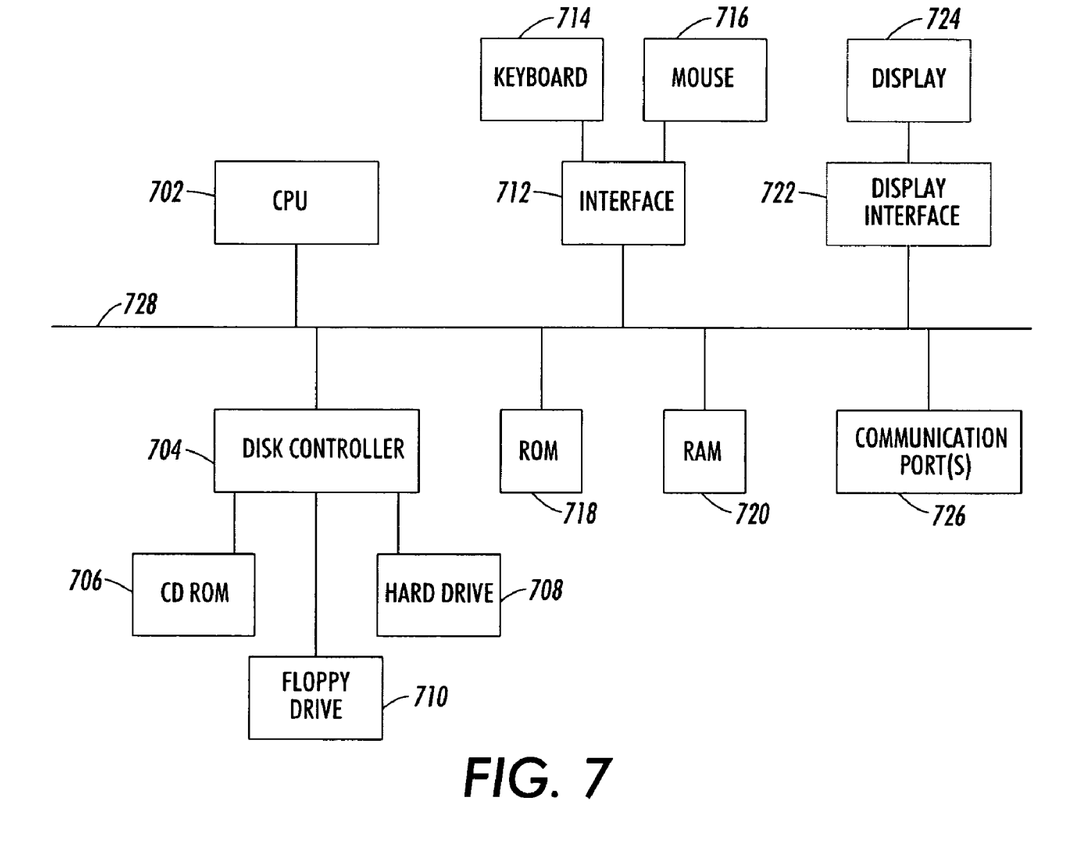
FIG. 7 is a block diagram of exemplary internal hardware that may be used to contain or implement the program instructions according to an embodiment.

Any or all of the steps listed above may be implemented on a computing device or otherwise via computer program instructions. FIG. 7 is a block diagram of exemplary internal hardware that may be used to contain or implement program instructions according to an embodiment. Referring to FIG. 7, a bus 728 may serve as a main information highway interconnecting the other illustrated components of the hardware. CPU 702 is the central processing unit of the system, performing calculations and logic operations required to execute a program. Read only memory (ROM) 718 and random access memory (RAM) 720 constitute exemplary memory devices.

A disk controller 704 interfaces with one or more optional disk drives to the system bus 728. These disk drives may be external or internal floppy disk drives such as 710, CD ROM drives 706, or external or internal hard drives 708. As indicated previously, these various disk drives and disk controllers are optional devices.

Program instructions may be stored in the ROM 718 and/or the RAM 720. Optionally, program instructions may be stored on a computer readable medium such as a floppy disk or a digital disk or other recording medium, a communications signal or a carrier wave.

An optional display interface 722 may permit information from the bus 728 to be displayed on the display 724 in audio, graphic or alphanumeric format. Communication with external devices may optionally occur using various communication ports 726. An exemplary communication port 726 may be attached to a communications network, such as the Internet or an intranet.

In addition to computer-type components and their equivalents, the hardware may also include an interface 712 which allows for receipt of data from input devices such as a keyboard 714 or other input device 716 such as a remote control, pointer and/or joystick.

A multiprocessor system may optionally be used to perform one, some or all of the operations described herein. Likewise, an embedded system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for generating a monotonic classifier, the method comprising:
    mapping a plurality of feature vectors to a plurality of ordered classes, wherein each feature vector maps to a corresponding class;
    for each class other than a lowest-ordered class, training, via a processor, a binary classifier to distinguish between the class and a preceding class, wherein training a binary classifier comprises:
        determining a data set impurity value for a data set of feature vectors, wherein the data set impurity value equals the sum, over all classes, of the product of (i) the number of feature vectors in the data set having a particular class divided by the number of feature vectors in the data set and (ii) the logarithm of the number of feature vectors in the data set having the particular class divided by the number of feature vectors in the data set,
        determining a decision rule for separating the data set into a plurality of subsets that maximizes the decrease in impurity, wherein the decrease in impurity equals the data set impurity value for the data set minus, for each subset, the product of a number of feature vectors in the subset and a data set impurity value for the subset divided by the number of feature vectors in the data set, and repeating the determining a data set impurity and the determining a decision rule on one or more subsets until the data set impurity value for each subset is minimized; and ordering, via the processor, the binary classifiers as a monotonic classifier based on the class corresponding to each binary classifier, wherein a number of classes in the plurality of ordered classes is one more than a number of binary classifiers.

2. The method of claim 1 wherein ordering the binary classifiers comprises ordering the binary classifier as a balanced binary decision tree.

3. The method of claim 1 wherein ordering the binary classifiers comprises ordering the binary classifiers as an unbalanced binary decision tree.

4. The method of claim 1 wherein ordering the binary classifiers comprises ordering the binary classifiers as a class-ordered linear chain of binary classifiers.

5. The method of claim 1 wherein mapping a plurality of feature vectors to a plurality of ordered classes comprises:
ordering the plurality of classes in a linear order; and
for each feature vector, assigning the feature vector to a particular class, wherein the feature vector is not greater than any feature vector corresponding to a class that is greater than the particular class.

6. The method of claim 1 wherein the ordered classes comprise one or more of the following:
personal data;
a credit score;
a housing price; and
a test score.

7. A system for generating a monotonic classifier, the system comprising:
a processor; and
a memory,
wherein the memory comprises one or more programming instructions for performing a method for generating a monotonic classifier, the method comprising:
mapping a plurality of feature vectors to a plurality of ordered classes, wherein each feature vector maps to a corresponding class,
for each class other than a lowest-ordered class, training a binary classifier to distinguish between the class and a preceding class, wherein training a binary classifier comprises:
determining a data set impurity value for a data set of feature vectors, wherein the data set impurity value equals the sum, over all classes, of the product of (i) the number of feature vectors in the data set having a particular class divided by the number of feature vectors in the data set and (ii) the logarithm of the number of feature vectors in the data set having the particular class divided by the number of feature vectors in the data set,
determining a decision rule for separating the data set into a plurality of subsets that maximizes the decrease in impurity, wherein the decrease in impurity equals the data set impurity value for the data set minus, for each subset, the product of a number of feature vectors in the subset and a data set impurity value for the subset divided by the number of feature vectors in the data set, and
repeating the determining a data set impurity and the determining a decision rule on one or more subsets until the data set impurity value for each subset is minimized, and
ordering the binary classifiers as a monotonic classifier based on the class corresponding to each binary classifier, wherein a number of classes in the plurality of ordered classes is one more than a number of binary classifiers.

8. The system of claim 7 wherein ordering the binary classifiers comprises one or more programming instructions for ordering the binary classifier as a balanced binary decision tree.

9. The system of claim 7 wherein ordering the binary classifiers comprises one or more programming instructions for ordering the binary classifiers as an unbalanced binary decision tree.

10. The system of claim 7 wherein ordering the binary classifiers comprises one or more programming instructions for ordering the binary classifiers as a class-ordered linear chain of binary classifiers.

11. The system of claim 7 wherein mapping a plurality of feature vectors to a plurality of ordered classes comprises one or more programming instructions for:
ordering the plurality of classes in a linear order; and
for each feature vector, assigning the feature vector to a particular class, wherein the feature vector is not greater than any feature vector corresponding to a class that is greater than the particular class.

12. The system of claim 7 wherein the ordered classes comprise one or more of the following:
personal data;
a credit score;
a housing price; and
a test score.

13. A computer-implemented method of assigning a credit-worthiness score to an applicant, the method comprising:
mapping a plurality of feature vectors to a plurality of ordered credit-worthiness classes, wherein each feature vector maps to a corresponding credit-worthiness class;
for each credit-worthiness class other than a lowest-ordered credit-worthiness class, training, via a processor, a binary classifier to distinguish between the credit-worthiness class and a preceding credit-worthiness class, wherein training a binary classifier comprises:
determining a data set impurity value for a data set of feature vectors, wherein the data set impurity value equals the sum, over all credit-worthiness classes, of the product of (i) the number of feature vectors in the data set having a particular credit-worthiness class divided by the number of feature vectors in the data set and (ii) the logarithm of the number of feature vectors in the data set having the particular credit-worthiness class divided by the number of feature vectors in the data set,
determining a decision rule for separating the data set into a plurality of subsets that maximizes the decrease in impurity, wherein the decrease in impurity equals the data set impurity value for the data set minus, for each subset, the product of a number of feature vectors in the subset and a data set impurity value for the subset divided by the number of feature vectors in the data set, and
repeating the determining a data set impurity and the determining a decision rule on one or more subsets until the data set impurity value for each subset is minimized;

ordering, via the processor, the binary classifiers as a monotonic classifier based on the credit-worthiness class corresponding to each binary classifier, wherein a number of credit-worthiness classes in the plurality of ordered credit-worthiness classes is one more than a number of binary classifiers;

receiving applicant data pertaining to an applicant;

organizing, via the processor, the applicant data into an applicant feature vector pertaining to the applicant; and assigning a credit-worthiness class to the applicant based on the monotonic classifier and the applicant feature vector.

14. The method of claim 13 wherein mapping a plurality of feature vectors to a plurality of ordered credit-worthiness classes comprises:

ordering the plurality of credit-worthiness classes in a linear order; and for each feature vector, assigning the feature vector to a particular credit-worthiness class, wherein the feature vector is not greater than any feature vector corresponding to a credit-worthiness class that is greater than the particular credit-worthiness class.

15. The method of claim 13 wherein the applicant data comprises one or more of the following:

personal income;
years of employment;
years of home ownership; and
outstanding debt.

* * * * *